US005530438A

United States Patent [19]
Bickham et al.

[11] Patent Number: 5,530,438
[45] Date of Patent: Jun. 25, 1996

[54] METHOD OF PROVIDING AN ALERT OF A FINANCIAL TRANSACTION

[75] Inventors: Richard S. Bickham, Cary; Robert W. Furtaw, Lake Zurich; Joseph G. Schultz, Bartlett; Arun Sobti, South Barrington; Kenneth J. Zdunek, Schaumburg, all of Ill.

[73] Assignee: Motorola, Inc., Schaumburg, Ill.

[21] Appl. No.: 370,276

[22] Filed: Jan. 9, 1995

[51] Int. Cl.⁶ .................................................. G08B 5/22
[52] U.S. Cl. ........................ 340/825.340; 340/825.44; 235/380; 380/23; 364/401
[58] Field of Search ..................... 340/825.27, 825.44, 340/825.34; 235/380, 382, 383; 379/91; 348/3; 455/2; 364/401; 380/23

[56] References Cited

U.S. PATENT DOCUMENTS

| | | | |
|---|---|---|---|
| 4,644,351 | 2/1987 | Zabarsky et al. | 340/825.44 |
| 4,811,408 | 3/1989 | Goldman | 340/825.34 |
| 5,005,014 | 4/1991 | Jasinski | 340/825.44 |
| 5,208,446 | 5/1993 | Martinez | 235/380 |
| 5,221,338 | 6/1993 | Gutman et al. | 235/379 |
| 5,239,462 | 8/1993 | Jones et al. | 364/401 |
| 5,321,751 | 6/1994 | Ray et al. | 380/23 |
| 5,335,246 | 8/1994 | Yokev et al. | 340/825.44 |
| 5,398,021 | 3/1995 | Moore | 340/825.44 |
| 5,416,306 | 5/1995 | Imahata | 235/380 |
| 5,420,924 | 5/1995 | Berson et al. | 380/23 |

FOREIGN PATENT DOCUMENTS

| | | | |
|---|---|---|---|
| 9402908 | 2/1994 | WIPO | 235/380 |
| 9402909 | 2/1994 | WIPO | 235/380 |
| 9419770 | 9/1994 | WIPO | 235/380 |

*Primary Examiner*—Michael Horabik
*Assistant Examiner*—William H. Wilson, Jr.
*Attorney, Agent, or Firm*—James A. Coffing; George C. Pappas

[57] ABSTRACT

A radio system user (126) is alerted (129) as to the occurrence of a financial transaction by a customer (118). Data (122) is obtained from the customer (118) and used to identify a radio system user (126), who is authorized to conduct the financial transaction. A message, indicative of the financial transaction, is automatically provided to a radio system and broadcast (129) to the radio system user (126), thereby alerting the user (126) to the financial transaction.

26 Claims, 2 Drawing Sheets

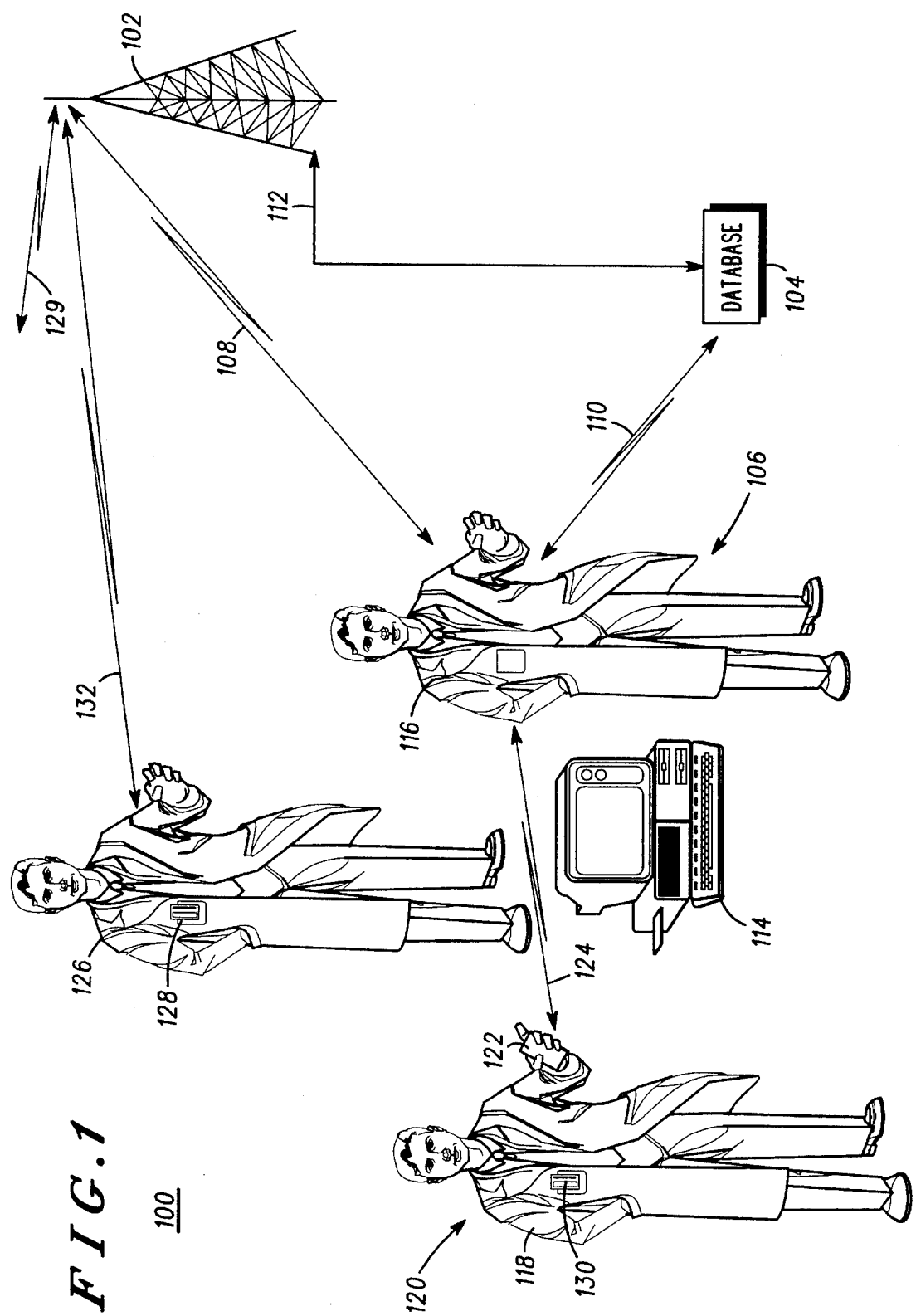

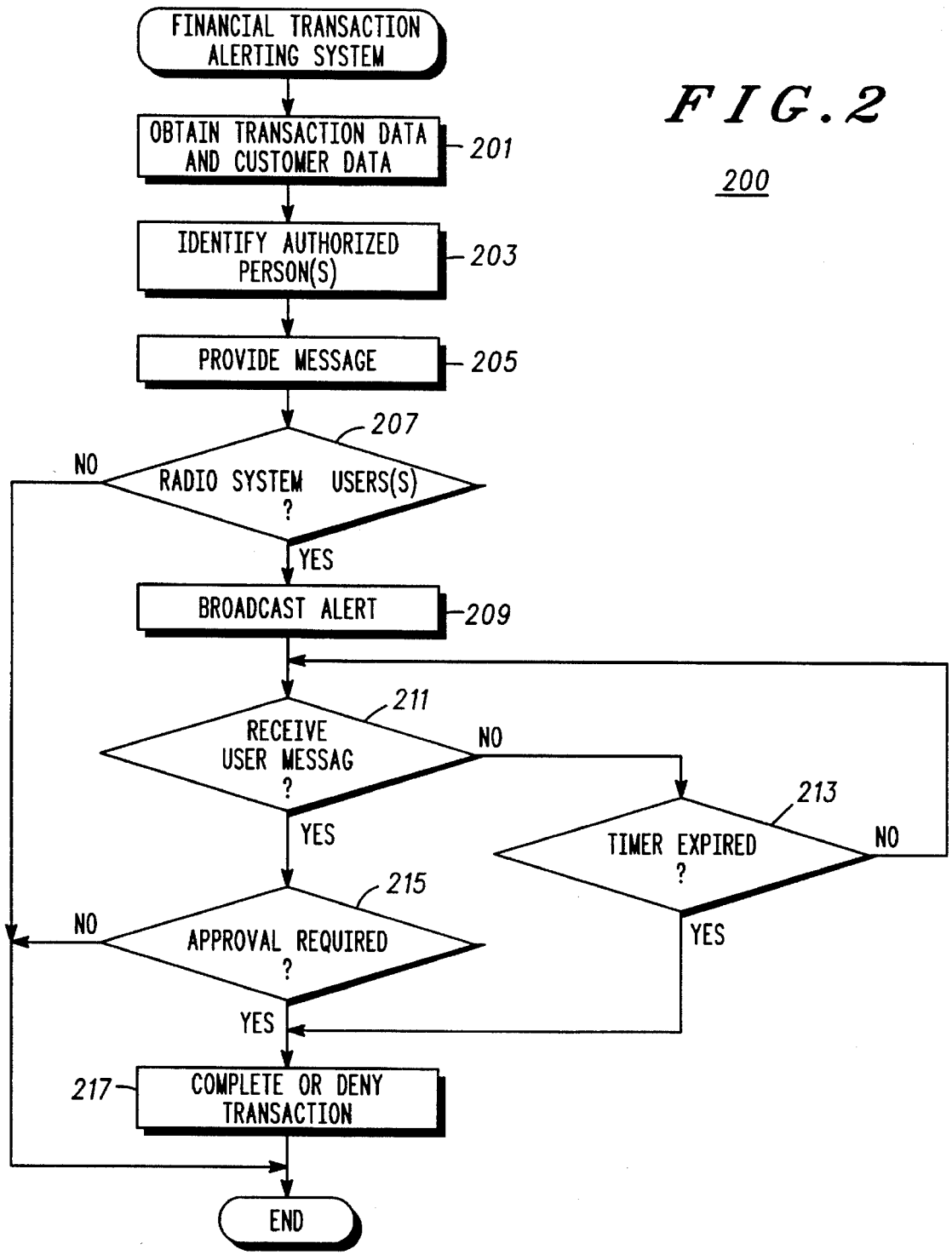

METHOD OF PROVIDING AN ALERT OF A FINANCIAL TRANSACTION

FIELD OF THE INVENTION

This invention relates generally to radio communication systems, and in particular, to such systems that provide an alert during or after the occurrence of a financial transaction.

BACKGROUND OF THE INVENTION

Credit and debit accounts of various sorts have permeated today's financial environment. It is a matter of convenience for holders of these accounts to pay for goods and services or conduct financial transfers by presenting the appropriate account card or account number to the provider of such goods and services. The foregoing is done with the understanding that they will be billed for the sale amount at a later date, or that their accounts will be immediately updated to reflect the transaction. The need to carry money or have a sufficient amount of money available in a checking account is no longer required. In order to obtain credit accounts, one must generally have a proven, reliable credit history which is devoid of past due payments to creditors.

Unfortunately, the credit system is subject to a significant level of criminal activity through the unauthorized use of existing credit cards or account numbers, and the illicit opening Of fraudulent credit accounts. [It is noted that the cost of credit card fraud in the United States alone is enormous and increasing yearly. US credit card fraud reached $858 million in 1992, more than twice the 1989 total (source: American Banker - Jan. 21, 1993, Vol. 158, No. 13, pg. 1]

The following two scenarios are but a few of the ways that unscrupulous persons might disadvantage the unwary consumer:

Lost or stolen credit cards might be used by an unauthorized person (perpetrator) to purchase goods or services, while the authorized card holder (victim) is assessed charges for those goods or services until the card is reported lost or stolen. This might constitute a significant delay if, for example, the cardholder is unaware for some time that the card is lost or stolen.

Credit cards might be applied for by a third party (perpetrator) using another person's (victim's) name, social security number and limited additional information (e.g., address, date-of-birth). The perpetrator might also open new accounts under a different billing address, charge goods and services to the new account and ignore the bills. In this scenario, the victim is ultimately contacted and asked to pay for the accrued charges, though they had nothing to do with their existence. Meanwhile, the victim's credit rating deteriorates while the problem is being rectified.

In the past, credit issuers and providers of goods and services have taken some steps to protect themselves from such fraud. Prior art techniques involve on-line credit checks at the point of sale; i.e., electronic access to off-site databases to determine whether the credit account being used by a purchaser is valid, or if cards issued under that account have been reported lost or stolen by the account owner or cardholder. This approach prevents fraudulent use of the victim's illicitly obtained (e.g., lost or stolen) cards only after the victim reports the loss/theft to the issuing organization. As mentioned earlier, the victim may not be aware of the loss immediately, so the cards can be easily used by the perpetrator until such time that the loss is reported.

Similarly, use by the perpetrator of illicitly obtained cards can take place freely until such time that the issuing organization denies credit transactions due to account delinquency, or the victim becomes aware of the fraudulent account and cancels it. Of course, this process may take many months, during which a substantial quantity of goods and services might be fraudulently procured. Compounding this problem is the common practice of the perpetrator opening a large number of such fraudulent accounts under the victim's name and social security number.

In addition to the aforementioned, some account issuers monitor account activity in real-time and compare present activity with historic patterns of use for that cardholder. This is done in an attempt to identify suspicious activity indicative of fraudulent use, and to deny transactions in such instances. Of course, this technique is subjective in nature and might therefore lead to improper occurrences of both denial of legitimate transactions and approval of fraudulent transactions. Account issuers also offer credit protection plans, however such plans only limit the victim's liability, but do not prevent fraudulent transactions from occurring. Neither of these practices are capable of protecting victims from activity on unauthorized accounts, opened under a victim's name and social security number, when the victim is unaware of these accounts.

Still other systems are being proposed that might compare a physical characteristic (e.g., fingerprint, retina-scan or voiceprint) of the cardholding purchaser to information encoded on the credit card itself as a means of identity verification. However, not only is this system very costly, it is ineffective for telephone transactions, an increasingly popular method used for purchase and banking transactions. Additionally, the characteristic identification scheme fails to address the problem of unauthorized accounts, and might ultimately be defeated by a criminal population whose technical expertise increases with time.

Accordingly, there exists a need to effectively combat the problem of consumer account fraud. A solution capable of alerting the point of sale provider of goods and services, the relevant financial institution, and the potential victim to an impending fraudulent transaction, would be an improvement over the prior art. Further, a method that provides the ability to prevent completion of a fraudulent transaction, in real time (i.e., while it is being attempted), would be quite beneficial.

BRIEF DESCRIPTION OF THE DRAWINGS

FIG. 1 shows a simplified block diagram of a financial transaction alerting system, in accordance with the present invention; and FIG. 2 shows a simplified flow diagram depicting operation of the system shown in FIG. 1.

DESCRIPTION OF A PREFERRED EMBODIMENT

The invention encompasses a method of providing, to a radio system user, an alert of a financial transaction of interest to that user. Identifying data is obtained from a customer who seeks to engage in a financial transaction, and at least a part of that data is used to identify the radio system user, who is authorized to conduct the financial transaction. A message that is indicative of the financial transaction is automatically provided to a radio system, from which it is broadcast to the radio system user. In this manner, the radio system user is alerted to the financial transaction, in a time that would enable the user to participate in approval of the financial transaction, if desired.

The invention can be better understood with reference to FIGS. 1–2. FIG. 1 shows a simplified block diagram of a system (100) in which an alertable financial transaction occurs, in accordance with the present invention. The system (100) includes at least one radio system (102) that is capable of transmitting messages within a particular coverage area, (i.e., a known paging system might be effectively utilized). Alternatively, two-way wireless communication systems, such as conventional or trunked radio systems, might be used to effectuate and support either one-way or two-way communications, as later described. In addition, the system includes a database (104) that retains information as described herein, and can either be located remotely with respect to the radio system (102), or can be an integral part thereof, depending upon the needs of a particular application.

Pursuant to a first embodiment, the radio system (102) is coupled to a point of sale system (106), via a direct link (108). Alternatively, the point of sale system (106) is coupled indirectly, through the database (104), to the radio system (102), via a database link (110) and an indirect (i.e., database-to-radio system) link (112). Either of these connections between the point of sale system (106) and the radio system (102) might be employed to affect the transfer of information regarding a financial transaction, as later described.

The point of sale system (106) includes an input data device (114) and a goods/services provider (116). The input data device (114) receives financial transaction information and, optionally, other identifying information from a customer (118) at a customer locale (120), which may be either collocated with, or remote from, the provider (116). In the case of a remote location, a customer link (124) might include a telephone line, modem link, or similar link. This information is then provided to the radio system (102) (either directly or indirectly) via any number of known prior art mechanisms, including both wireline and wireless paths. The customer (118) seeking to engage in a financial transaction with a provider (116) conveys identifying data (122) to the provider (116). The identifying data (122, e.g., an account number for a credit or debit account) is then combined with transaction data (i.e., data specific to the financial transaction). As an example, the amount of money involved in, the date of, the time of day of, and/or the location of the financial transaction might be included, depending on system capacity and requirements.

In a first embodiment, the provider (116) conveys to the database (104), via the database link (110), at least a part of the received financial transaction and other identifying information from a customer. A request is then sent on the database link (110) to determine a unique personal identifier (e.g., social security number) associated with a person authorized to conduct the financial transaction Once received, the response to this request might then be sent to the radio system (102) using the direct link (108). In this embodiment, a message indicative of the financial transaction (i.e., either specifying the existence of, or details pertaining to, a particular transaction attempt) and the unique personal identifier associated with a person authorized to conduct the financial transaction is conveyed to the radio system (102). It should be noted that, in an alternate embodiment, a second level of transaction authority is contemplated, as briefly described later.

As a person authorized to conduct a financial transaction, a radio system user (126) possesses a radio (128) that is capable of receiving broadcasts (129) from the radio system (102). The radio (128) might be a one-way device (e.g., pager) or a two-way device (e.g., dispatch radio, acknowledgment pager), both of which are known in the art. In either arrangement, the radio (128) includes some type of alerting device (e.g., buzzer, audio signal generating circuit and speaker, vibration imparting device, or other appropriate enunciation mechanism) also known in the art. Upon receipt of the financial transaction information and the identifying data, the radio system (102) automatically uses the identifying data to determine if the person authorized to conduct the financial transaction is a radio system user. If the unique identifier corresponds to a subscribing radio user, the radio system (102) broadcasts an alerting message (129) to the radio (128) that is registered with the authorized radio system user (126). It should be noted that the message might be broadcast immediately upon identification of the radio system user (126), or done so in accordance with a schedule (e.g., as prearranged between the operator of the radio system and the radio system user). It is further noted that the radio system user (126, i.e., individual authorized to conduct the financial transaction) might very well also be the customer (118) attempting to engage in the transaction. In this case, the customer (118) possesses a radio (130) that is capable of receiving the alert message. In the foregoing manner, the authorized person (126) is alerted to the fact that a pertinent financial transaction is occurring, or has occurred.

Having been so alerted, the radio system user (126) might optionally use the radio (128) to review information pertaining to the financial transaction and/or information pertaining to the customer (118), as later described. The radio system user (126) might further use the radio (128) to broadcast a user message (132), which might include a request to approve or disapprove the financial transaction. In this arrangement, the user message (132) is received by the radio system (102) and delivered to the provider (116), who uses the message in deciding whether to complete or deny the financial transaction. The radio system (102) might also measure the time elapsed since the financial transaction message was broadcast and, after a predetermined time, deliver an appropriate message to the provider (116), as later described.

There are, of course, alterations or modifications to the above that can be made. For example, information regarding one or more physical characteristics of the customer (118) might be obtained by the provider (116) and made a part of a message (129) that is transmitted to the radio system user authorized to conduct the financial transaction (126). Such information might be automatically provided in a variety of ways, such as a finger print reader, retinal eye scanner, digital photography, voice sampling, etc. The physical characteristic information might also be entered by the provider (116) after making a personal observation of the customer (118). It should be noted that, to facilitate the above, it may be necessary to provide a more highly featured radio (128, 130). For example, to display a digitized photograph of the customer (118) the radio (128, 130) would either need an integral display capability or otherwise be provided with some means of transferring that information to another display medium. Such physical characteristic information, when provided to the radio system user authorized to conduct the financial transaction, provides an additional layer of protection that can be effectively used to adequately prevent illicit financial transaction activities.

FIG. 2 shows a simplified flow diagram (200) depicting operation of the financial transaction alerting system (100 shown in FIG. 1), in accordance with the present invention. When a customer seeks to engage in a financial transaction, transaction data and customer data are obtained (201). Transaction data includes data specific to the financial transaction sought by the customer, such as transaction type, amount of money involved, location, etc. Further, customer data is used to identify the person initiating the financial transaction, such as a physical characteristic. The authorized person(s) are then identified (203), so that they can be alerted to the attempt of a financial transaction, as earlier described. It should be noted that when two or more persons are identified, multiple alert messages might be sent to those persons identified, and multiple or single approvals could be required to consummate the transaction. A message is then provided (205) to the alerting radio system, which message is indicative of the financial transaction being sought, as well as the unique personal identifier associated with the person authorized to conduct the financial transaction.

A decision (207) is then reached to determine whether the identified person(s) are bonafide radio system users–i.e., whether they are subscribers to the alerting service. It should be noted that the present invention contemplates some type of customer-paid subscription service to pay the costs of broadcasting the alerts, but alternate arrangements are certainly possible. One such possibility includes the goods/ services provider paying for the service as a deterrent to fraudulent activity at their establishment.

If the identified person(s) are not radio system users, the routine is exited. However, if the identified person(s) are radio system users, an alert is automatically broadcast (209) to the person(s) so identified. After the alert, the radio system waits (211), for a predetermined time (213), to receive a user message. When a user message pertaining to the financial transaction is received, a determination (215) is made as to whether or not approval of the financial transaction is required. If approval is required (i.e., pursuant to a predetermined arrangement with the system user), the goods/ service provider then either completes or denies (217) the transaction on the basis of whether the radio system user approves (e.g., as determined by the contents of an approval message sent from the user to the radio system). Otherwise, the routine is simply exited, having the effect of alerting the radio user without an approval element.

Use of a timer (213) is contemplated as follows: when a user message pertaining to the financial transaction is not received before the timer expires, the financial transaction may be completed or denied (217), in accordance with a predetermined arrangement made by the person authorized to conduct the financial transaction. In this manner, the authorized user might arrange to enable completion of only those transactions that are positively approved (e.g., by a response signal transmitted to the radio system). Similarly, an arrangement can be made that approves all transactions that are not specifically disapproved within a certain time. Further, if the identified person(s) are not radio system users, a message indicative of this fact might be sent to the goods/services provider.

What is claimed is:

1. A method of providing an alert of a financial transaction, comprising:

obtaining at least some identifying data from a customer who seeks to engage in a financial transaction;

using at least a part of the identifying data to identify a radio system user who is authorized to conduct the financial transaction;

automatically providing a message indicative of the financial transaction to at least a first radio system; and automatically broadcasting from at least the first radio system a message to the radio system user, such that the radio system user will be alerted to the financial transaction.

2. The method of claim 1, wherein the step of obtaining at least some identifying data from a customer includes the step of obtaining a credit account number.

3. The method of claim 1, wherein the step of obtaining at least some identifying data from a customer includes the step of obtaining a debit account number.

4. The method of claim 1, wherein the step of using at least a part of the identifying data to identify a radio system user who is authorized to conduct the financial transaction includes the step of:

using the at least a part of the identifying data to determine a unique personal identifier for the radio system user.

5. The method of claim 4, wherein the step of using the at least a part of the identifying data to determine a unique personal identifier for the radio system user includes the step of determining a unique personal identifier comprising a social security number for the radio system user.

6. The method of claim 1, wherein the steps of using at least a part of the identifying data to identify a radio system user who is authorized to conduct the financial transaction and of automatically providing a message indicative of the financial transaction to at least a first radio system include the steps of:

providing the at least a part of the identifying data to a database, which database has information regarding the radio system user, such that the radio system user can be identified; and providing information regarding the radio system user so identified to at least the first radio system.

7. The method of claim 1, wherein the steps of using at least a part of the identifying data to identify a radio system user who is authorized to conduct the financial transaction and of automatically providing a message indicative of the financial transaction to at least a first radio system include the steps of:

providing the at least a part of the identifying data to at least the first radio system; and providing the at least a part of the identifying data to a database, which database has information regarding the radio system user, such that the radio system user can be identified.

8. The method of claim 1, wherein the step of automatically providing a message indicative of the financial transaction to at least a first radio system includes the step of automatically providing a message to at least the first radio system indicative of an amount of money that is involved in the financial transaction.

9. The method of claim 1, wherein the step of automatically providing a message indicative of the financial transaction to at least a first radio system includes the step of automatically providing a message to at least the first radio system indicative of at least a date of the financial transaction.

10. The method of claim 1, wherein the step of automatically providing a message indicative of the financial transaction to at least a first radio system includes the step of automatically providing a message to at least the first radio system indicative of at least a date and a time of day of the financial transaction.

11. The method of claim 1, wherein the step of automatically providing a message indicative of the financial transaction to at least a first radio system includes the step of automatically providing a message to at least the first radio system indicative of at least one location that is pertinent to the financial transaction.

12. The method of claim 1, and further including the step of receiving from the radio system user a user message.

13. The method of claim 12, wherein the step of receiving from the radio system user a user message includes the step of receiving, via the at least a first radio system, a user message comprising an approval message for the financial transaction.

14. The method of claim 13, and further including the step of using the approval message to further direct completion of the financial transaction.

15. The method of claim 1, wherein the step of automatically broadcasting from at least the first radio system a message to the radio system user includes the step of automatically broadcasting, pursuant to a predetermined schedule, the message to the radio system user.

16. The method of claim 15, wherein the step of automatically broadcasting, pursuant to a predetermined schedule, includes the step of automatically broadcasting, pursuant to a predetermined schedule selected by the radio system user, the message to the radio system user.

17. A method of providing an alert of a financial transaction, comprising:

obtaining at least some identifying data from a customer who seeks to engage in a financial transaction;

using at least a part of the identifying data to identify a radio system user who is authorized to conduct the financial transaction;

automatically providing a message indicative of the financial transaction to at least a first radio system;

automatically broadcasting from at least the first radio system a message to the radio system user, which message includes information specific to the financial transaction, such that the radio system user will be alerted to the financial transaction; and receiving from the radio system user a user message.

18. The method of claim 17, wherein the step of automatically broadcasting from at least the first radio system a message to the radio system user includes the step of automatically broadcasting from at least the first radio system a message to the radio system user, which message includes information specific to the financial transaction, including at least an indication of an amount of money that is involved in the financial transaction.

19. The method of claim 17, wherein the step of receiving from the radio system user a user message includes the step of receiving, via the at least a first radio system, a user message comprising an approval message for the financial transaction.

20. The method of claim 19, and further including the step of using the approval message to further direct completion of the financial transaction.

21. A method of conducting a financial transaction, comprising:

obtaining at least some identifying data from a purchaser's financial transaction device at a point of sale;

using at least a part of the identifying data to identify a radio system user who is authorized to conduct the financial transaction;

automatically providing a message indicative of the financial transaction to at least a first radio system;

broadcasting from at least the first radio system a message to the radio system user, such that the radio system user will be alerted to the financial transaction;

receiving from the radio system user a user message; and using the user message to further direct the financial transaction.

22. The method of claim 21, wherein when the user message comprises an approval, the step of using the user message to further direct the financial transaction includes the step of completing the financial transaction.

23. The method of claim 21, wherein when the user message comprises a disapproval, the step of using the user message to further direct the financial transaction includes the step of denying completion of the financial transaction.

24. A method of providing an alert of a financial transaction, comprising:

obtaining at least some identifying data from a customer who is at a first location and who seeks to engage in a financial transaction, including obtaining information at the first location regarding at least one physical characteristic of the customer;

using at least a part of the identifying data to identify a radio system user who is authorized to conduct the financial transaction;

automatically providing a first message indicative of the financial transaction to at least a first radio system, which first message at least includes some information regarding the at least one physical characteristic; and automatically broadcasting from at least the first radio system a second message to the radio system user, which second message at least includes some information regarding the at least one physical characteristic, such that the radio system user will be alerted to the financial transaction and will be further provided with information regarding the at least one physical characteristic of the customer seeking to engage in the financial transaction.

25. The method of claim 24, wherein the step of obtaining at least some identifying data from a customer, including obtaining information at the first location regarding at least one physical characteristic of the customer, includes the step of obtaining information at the first location regarding physical appearance of at least a portion of the customer.

26. The method of claim 24, and further including the step of receiving from the radio system user a user message.

* * * * *